(12) United States Patent
Kato (10) Patent No.: US 11,355,802 B2
(45) Date of Patent: Jun. 7, 2022

(54) SECONDARY BATTERY HAVING IMPROVED MANUFACTURABILITY AND PERFORMANCE

(71) Applicant: TOYOTA JIDOSHA KABUSHIKI KAISHA, Toyota (JP)

(72) Inventor: Masashi Kato, Konan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 41 days.

(21) Appl. No.: 16/842,929

(22) Filed: Apr. 8, 2020

(65) Prior Publication Data
US 2020/0343492 A1  Oct. 29, 2020

(30) Foreign Application Priority Data

Apr. 26, 2019 (JP) .............................. JP2019-086255
Feb. 27, 2020 (JP) .............................. JP2020-031664

(51) Int. Cl.
*H01M 50/172* (2021.01)
*H01M 50/124* (2021.01)
*H01M 50/531* (2021.01)
*H01M 50/543* (2021.01)

(52) U.S. Cl.
CPC ....... *H01M 50/172* (2021.01); *H01M 50/124* (2021.01); *H01M 50/531* (2021.01); *H01M 50/543* (2021.01)

(58) Field of Classification Search
CPC ............. H01M 50/172; H01M 50/124; H01M 50/531; H01M 50/543
See application file for complete search history.

(56) References Cited

U.S. PATENT DOCUMENTS 6,541,474 B2    4/2003   Kikuchi et al.
2003/0064286 A1  4/2003   Yoshida et al.
2004/0241537 A1* 12/2004  Okuyama ............ H01M 50/116
                                                      429/86

(Continued)

FOREIGN PATENT DOCUMENTS

CN      1947279 A     4/2007
EP      1744384 A1    1/2007
JP      2000195475 A  7/2000

(Continued)

*Primary Examiner* — Jimmy Vo
(74) *Attorney, Agent, or Firm* — Dickinson Wright, PLLC (57) ABSTRACT

According to the present disclosure, technology of preventing reduction of battery performances in manufacturing steps is provided for a secondary battery provided with a protective member for preventing cleavage of a welded part. A secondary battery disclosed herein includes an electrode body including a terminal connecting part, an exterior body including a welded part at an outer circumferential edge part, and an electrode terminal connected with the terminal connecting part. The secondary battery includes a protective member that is placed between the exterior body and the electrode body, and regulates shrinkage deformation of the exterior body toward a center in a width direction. The second battery further includes a movement regulating means for regulating movement of the protective member. This can prevent reduction of battery performances in manufacturing steps.

17 Claims, 9 Drawing Sheets

(56) References Cited

U.S. PATENT DOCUMENTS

2007/0231685 A1   10/2007   Takeuchi et al.
2009/0263712 A1*  10/2009   Mizuta .............. H01M 10/0436
                                              429/177

FOREIGN PATENT DOCUMENTS

| JP | 2001057190 A | 2/2001 |
| JP | 2001283798 A | 10/2001 |
| JP | 2003092132 A | 3/2003 |
| JP | 2005317312 A | 11/2005 |
| KR | 10-2007-0012842 A | 1/2007 |
| WO | 2013018552 A1 | 2/2013 |

\* cited by examiner

SECONDARY BATTERY HAVING IMPROVED MANUFACTURABILITY AND PERFORMANCE

CROSS REFERENCE TO RELATED APPLICATIONS

The present application claims the priority based on Japanese Patent Application No. 2019-86255 filed on Apr. 26, 2019 and Japanese Patent Application No. 2020-31664 filed on Feb. 27, 2020, the entire contents of which are incorporated herein by reference.

BACKGROUND

1. Technical Field

The present disclosure relates to a secondary battery in which an electrode body is accommodated in the inside of an exterior body made of a laminate film.

2. Description of the Related Art

In recent years, a lithium ion secondary battery, a nickel metal hydride battery, and other secondary batteries have grown in importance as the power supply to be mounted in a vehicle, or the power supplies of a personal computer and a portable terminal. Particularly, a lithium ion secondary battery is lightweight, and can provide a high energy density, and hence has been preferably used as a high-output power supply to be mounted in a vehicle. As one example of this kind of secondary battery, mention may be made of a secondary battery in which an electrode body is accommodated in the inside of an exterior body made of a laminate film (which will also be referred to as a "laminate battery"). For constructing such a laminate battery, with an electrode body interposed between a pair of laminate films, the outer circumferential edges of the laminate films are welded. As a result, an exterior body having a welded part at the outer circumferential edge is formed, and the electrode body is accommodated in the inside of the exterior body in a closed state. Examples of such a laminate battery are disclosed in Japanese Patent Application Publication No. 2005-317312, Japanese Patent Application Publication No. 2001-57190, Japanese Patent Application Publication No. 2003-92132, Japanese Patent Application Publication No. 2001-283798, and Japanese Patent Application Publication No. 2000-195475.

Incidentally, in a secondary battery, the battery internal pressure may be changed by the decompression treatment during the manufacturing process, gas generation entailed by charging and discharging, and the like. With a laminate battery, with such a change in battery internal pressure, the exterior body may undergo deformation such as expansion/shrinkage. Then, when the deformation amount of the exterior body increases, the welded part of the exterior body may be cleaved according to the stress upon deformation. For this reason, for a laminate battery, it is proposed that a protective member for regulating the deformation of the exterior body due to a change in internal pressure, and preventing the cleavage of the welded part is accommodated in the inside of the exterior body. Japanese Patent Application Publication No. 2005-317312 discloses a laminate battery including such a protective member (deformation regulating member).

SUMMARY

However, when such a protective member as in Japanese Patent Application Publication No. 2005-317312 is provided in the inside of the exterior body, a battery having largely reduced battery performances is manufactured with a higher frequency. As a result, there is a possibility that the production efficiency is reduced due to the disposal of defective products. The present invention has been completed in order to solve such a problem. It is a main object thereof to provide a technology of preventing reduction of battery performances in manufacturing steps for a secondary battery including a protective member for preventing cleavage of a welded part.

The present inventors conducted a study on the cause of the large reduction of the battery performances in manufacturing a laminate battery including a protective member provided therein in order to achieve the foregoing object, and as a result, they found the following findings.

Figure 9:
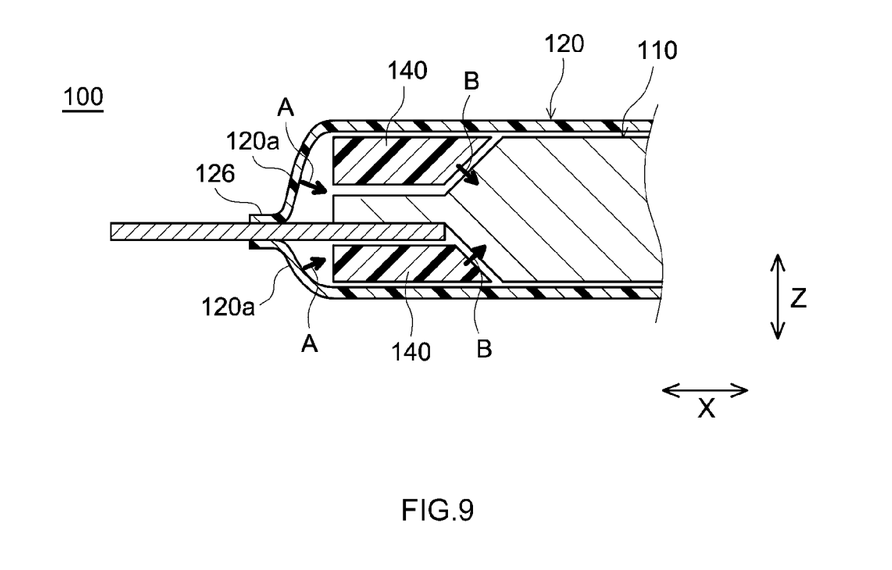
FIG. 9 is a cross sectional view schematically showing an internal structure in the vicinity of the electrode terminal of a conventional secondary battery.

As shown in FIG. 9, with a secondary battery 100 including a protective member 140, a protective member 140 is placed between the side edge part 120a of an exterior body 120 and an electrode body 110. The protective member 140 can regulate the shrinkage of the exterior body 120 toward the center in the width direction X (see an arrow A in FIG. 9). For this reason, it is possible to prevent the welded part 126 of the exterior body 120 from being cleaved by the stress upon shrinkage. However, in manufacturing of a secondary battery, a decompression treatment for vacuumizing the inside of the exterior body 120 may be carried out. In the decompression treatment, the exterior body 120 is largely shrunk, thereby pressing the protective member 140 toward the center in the width direction X. For this reason, as indicated with an arrow B in FIG. 9, the protective member 140 may move to the center in the width direction X, and may come into contact with the electrode body 110. The present inventors thought that the breakage of the electrode body 110 due to the contact with such a protective member 140 caused the reduction of the battery performances in the manufacturing steps.

The secondary battery disclosed herein has been provided based on the finding described above. Such a secondary battery includes an electrode body including a terminal connecting part constituted of a plurality of layers of collector foils bonded to one another; an exterior body constituted of a pair of laminate films facing each other across the electrode body, and including a welded part where the pair of laminate films are welded together formed at an outer circumferential edge part; and an electrode terminal being a plate-shaped conductive member extending along a width direction, wherein a first end of the electrode terminal is connected to the terminal connecting part and a second end of the electrode terminal is exposed to an outside of the exterior body. The secondary battery disclosed herein further includes a protective member that has a terminal insertion hole through which the electrode terminal is inserted, is placed between a side edge part of the exterior body in the width direction and the electrode body, and regulates shrinkage deformation of the exterior body toward a center in the width direction; and a movement regulating means for regulating movement of the protective member toward the center in the width direction.

With the secondary battery disclosed herein, the movement regulating means regulates the movement of the protective member toward the center (electrode body side) in the width direction. For this reason, even when the exterior body is largely shrunk by a decompression treatment or the like, it is possible to prevent the contact between the protective member and the electrode body. Therefore, with the secondary battery disclosed herein, it is possible to prevent the reduction of the battery performances due to the breakage of the electrode body irrespective of the provision of the protective member.

Further, in accordance with one aspect of the secondary battery disclosed herein, as the movement regulating means, at least one engaging part for engaging the protective member and the electrode terminal with each other is formed. This can properly regulate the movement of the protective member to the center in the width direction, which can preferably prevent the breakage of the electrode body due to the contact with the protective member.

In the aspect in which the engaging part is formed as the movement regulating means, the engaging part may be formed by fitting a projected part projecting inward in a depth direction from an inner wall of the terminal insertion hole of the protective member, and a recessed part being recessed inward in the depth direction from opposite side edge parts of the electrode terminal. This can properly regulate the movement of the protective member toward the center in the width direction.

In the aspect in which the engaging part is formed as the movement regulating means, the engaging part may be formed by fitting a projected part projecting outward in the depth direction from the opposite side edge parts of the electrode terminal, and a recessed part being recessed outward in the depth direction from the inner wall of the terminal insertion hole of the protective member with each other. Also, in the present aspect, the movement of the protective member toward the center in the width direction can be properly regulated.

In the aspect in which the engaging part is formed as the movement regulating means, the protective member may include a lower-side member including a step part that is formed at a central part in the depth direction, and has a smaller thickness than at opposite ends, and an upper-side member having a flat lower surface for making surface contact with upper surfaces of the opposite ends of the lower-side member. Use of the protective member thus divided into the two members allows the protective member and the electrode terminal to be engaged with each other in the inside of the terminal insertion hole with ease. This can contribute to the improvement of the manufacturing efficiency.

In accordance with another aspect of the secondary battery disclosed herein, as the movement regulating means, a holding member for holding the protective member at the terminal connecting part is formed. Also, in a case where the protective member is thus held at the terminal connecting part of the electrode body, the movement of the protective member toward the center in the width direction can be regulated, which can prevent the reduction of the battery performances due to the breakage of the electrode body.

In the aspect in which the holding member is mounted as the movement regulating means, a pair of the holding members may be mounted at outer ends in the width direction of the terminal connecting part so as to extend in the depth direction interposing the electrode terminal therebetween. This allows the protective member to be preferably held at the terminal connecting part, which can regulate the movement of the protective member toward the center in the width direction.

Further, in the aspect in which a pair of holding members are mounted so as to interpose the electrode terminal therebetween, a dimension $L_1$ of from an end of a first holding member to an end of a second holding member may be longer than a dimension $L_2$ of the terminal insertion hole in the depth direction ($L_1 > L_2$). This can more surely regulate the movement of the protective member toward the center in the width direction.

In accordance with a still other aspect of the secondary battery disclosed herein, as the movement regulating means, an adhesion layer for bonding the protective member to an inner wall surface of the exterior body is provided. Also, in a case where the exterior body and the protective member are thus bonded to each other, the movement of the protective member toward the center in the width direction can be regulated, and the electrode body can be prevented from being broken.

In another aspect of the secondary battery herein disclosed, the protective member has a rib part that holds the electrode terminal in height direction. For a conventionally known secondary battery, when an external force along the height direction is applied to the electrode terminal exposed to the outside of the exterior body, the electrode terminal reciprocates in the height direction, so that the connection part between the electrode terminal and the electrode body may be broken. In contrast, in the present aspect, the rib part of the protective member to hold the electrode terminal can regulate the reciprocation of the electrode terminal along the height direction. For this reason, in accordance with the present aspect, the connection part between the electrode terminal and the electrode body can be prevented from being broken.

Further, in the aspect in which the rib part of the protective member holds the electrode terminal, the rib part may hold the entire region in the depth direction of the electrode terminal situated in the inside of the terminal insertion hole. As a result, the reciprocation of the electrode terminal by an external force can be regulated with reliability, which can preferably prevent the breakage of the connection part between the electrode terminal and the electrode body. Further, in the present aspect, the terminal insertion hole is blocked by the rib part. For this reason, when the welded part of the exterior body is opened, foreign matters (such as fine active material particles) can also be prevented from being released to the outside of the battery.

Further, in the aspect in which the rib part of the protective member holds the electrode terminal, the pressure in the inside of the exterior body may be reduced by 10 kPa or more as compared with the standard atmospheric pressure. As a result, the protective member is pressurized from the outside of the exterior body. For this reason, the electrode terminal can be interposed more preferably at the rib part.

In a still other aspect of the secondary battery herein disclosed, in the protective member, an internal cavity communicating with the internal space of the exterior body is formed. For the secondary battery, the internal pressure of the exterior body tends to increase due to generation of a gas from the electrode body, and the like. For this reason, when a secondary battery whose warranty period has expired continues to be used for a long period, an increase in internal pressure results in expansion of the exterior body, so that the welded part may be cleaved. In contrast, in the present aspect, the internal cavity communicating with the internal space of the exterior body is formed in the protective member. For this reason, the volume of the inside of the exterior body capable of accommodating a gas increases. As a result, the period until the exterior body is expanded can be elongated. This can contribute to the extension of the warranty period of the battery.

In a still further aspect of the secondary battery herein disclosed, a clearance is formed between the end face on the electrode body side of the protective member and the electrode body. For a conventional secondary battery, in order to prevent the breakage due to the contact between the protective member and the electrode body, the following configuration is required: the end face on the electrode body side of the protective member is configured in such a shape as to follow the electrode body, so that the end face on the electrode body side of the protective member and the electrode body are brought into contact with each other. In contrast, for the secondary battery herein disclosed, the contact between the protective member and the electrode body can be prevented. For this reason, a clearance can be formed between the end face on the electrode body side of the protective member and the electrode body. As a result, the volume of the inside of the exterior body increases. For this reason, it is possible to suppress the cleavage of the welded part due to the expansion of the exterior body.

DETAILED DESCRIPTION

Below, a description will be given to a lithium ion secondary battery as one example of a secondary battery disclosed herein. Incidentally, the secondary battery disclosed herein is not limited to a lithium ion secondary battery, and may be, for example, a nickel metal hydride battery. Further, matters necessary for executing the present invention, except for matters specifically referred to in the present specification (e.g., materials for the electrode body, the exterior body, the electrode terminal, and the electrolyte) can be grasped as design matters of those skilled in the art based on the related art in the present field.

Incidentally, in the drawings shown in the present specification, the members/portions exerting the same action are given the same reference number and sign, and are described. Further, the dimensional relation (such as length, width, or thickness) in each drawing does not reflect the actual dimensional relation. Then, a reference sign X in each drawing denotes the "width direction", a reference sign Y denotes the "depth direction", and a reference sign Z denotes the "height direction". Incidentally, these directions are the direction set for convenience of description, and are not intended to restrict the setting form of the secondary battery disclosed herein.

The secondary battery disclosed herein has a movement regulating means for regulating the movement of the protective member accommodated in the inside of the exterior body toward the center in the width direction (electrode body side). As a result, even when the exterior body is largely shrunk during a decompression treatment, it is possible to prevent the contact between the protective member and the electrode body. For this reason, it is possible to prevent the reduction of the battery performances due to the breakage of the electrode body.

For such a movement regulating means, various structures in accordance with the structure of the secondary battery, or the like can be adopted. Below, as examples of the secondary battery having the movement regulating means, secondary batteries in accordance with first to fourth embodiments will be described.

1. First Embodiment

Figure 1:
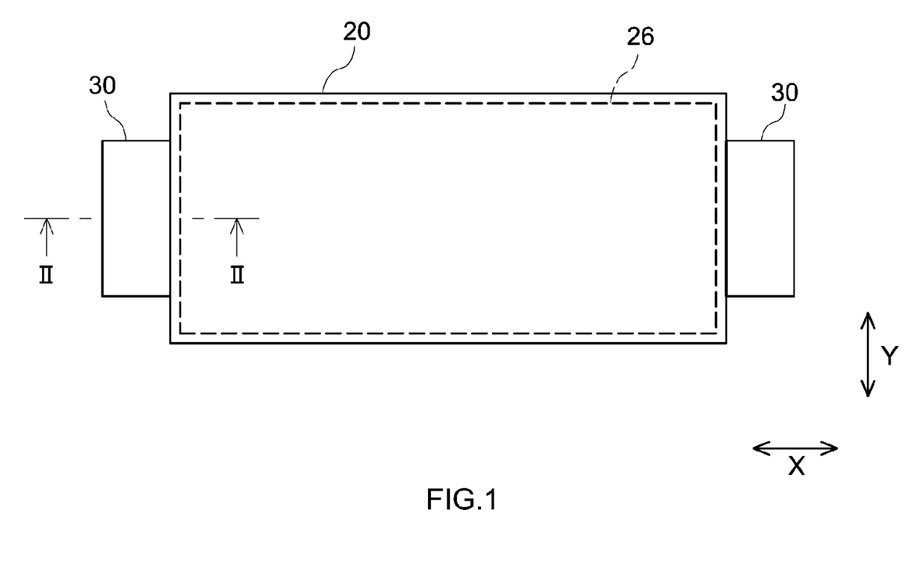
FIG. 1 is a plan view schematically showing a secondary battery in accordance with a first embodiment of the present invention.
Figure 2:
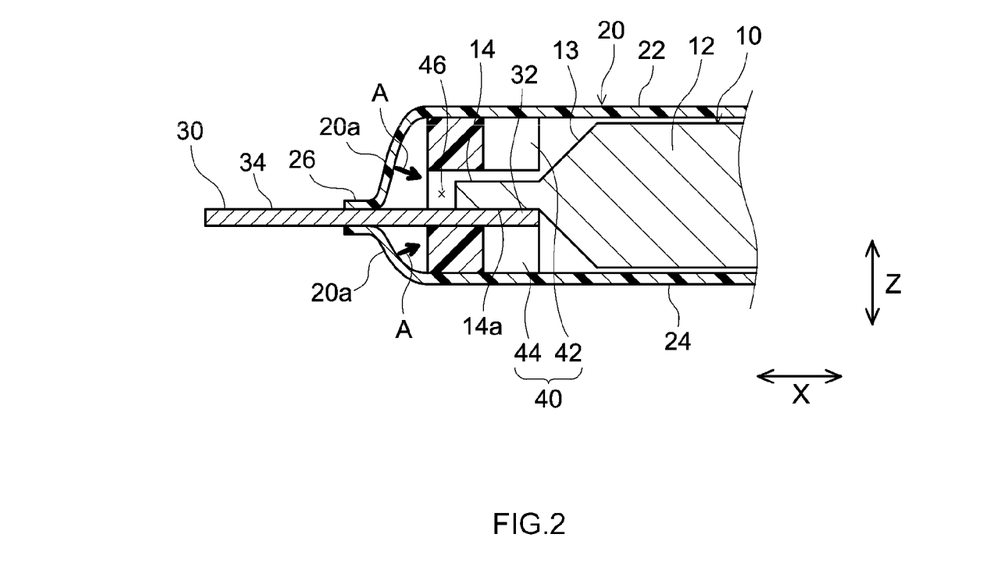
FIG. 2 is a cross sectional view along II-II in FIG. 1.
Figure 3:
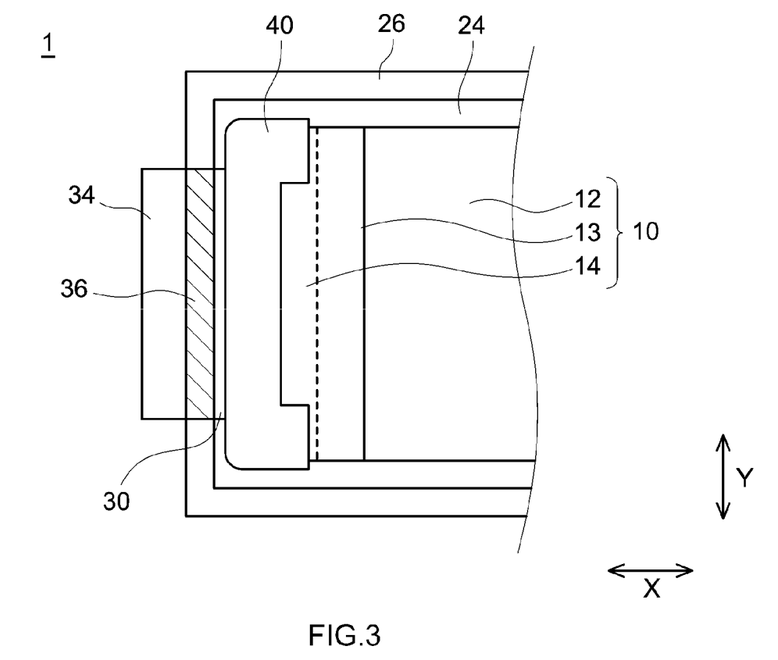
FIG. 3 is a plan view schematically showing an internal structure in the vicinity of the electrode terminal of the secondary battery in accordance with the first embodiment of the present invention.

FIG. 1 is a plan view schematically showing a secondary battery in accordance with a first embodiment. FIG. 2 is a cross sectional view along II-II in FIG. 1. Further, FIG. 3 is a plan view schematically showing an internal structure in the vicinity of the electrode terminal of the secondary battery in accordance with the first embodiment (i.e., FIG. 3 is a plan view showing a state in which the upper-side laminate film 22 in FIG. 2 is removed). Still further, FIG. 4 is a plan view for illustrating the movement regulating means of the secondary battery in accordance with the first embodiment (i.e., FIG. 4 is a plan view showing a state in which an exterior body 20 and an upper-side member 42 in FIG. 2 are removed).

As shown in FIGS. 1 to 3, a secondary battery 1 in accordance with the present embodiment includes an electrode body 10, an exterior body 20, an electrode terminal 30, and a protective member 40. Below, respective members will be described. Incidentally, with the secondary battery 1 in accordance with the present embodiment, substantially the same structures are provided on the right side and on the left side in the width direction X. However, for convenience, below, the structure in the vicinity of the electrode terminal 30 on the left side will be mainly described.

(1) Electrode Body

Figure 4:
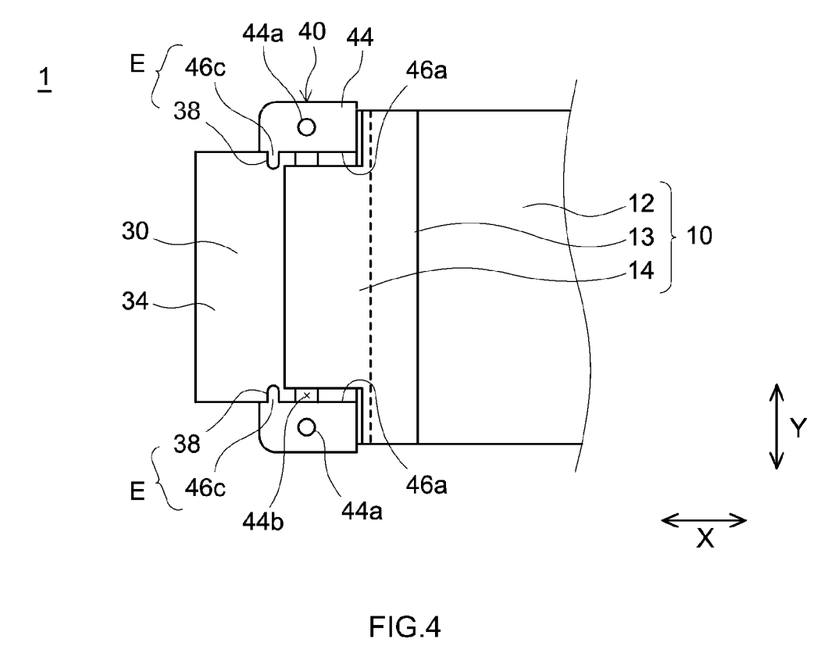
FIG. 4 is a plan view for illustrating a movement regulating means of the secondary battery in accordance with the first embodiment of the present invention.

As shown in FIGS. 2 to 4, at the side edge part in the width direction X of the electrode body 10, a terminal connecting part 14 constituted of a plurality of layers of collector foils bonded to one another is formed. Although not described in details by drawings, the electrode body 10 includes electrode sheets including a positive electrode and a negative electrode. Each electrode sheet includes a collector foil of a foil-shaped metal member, and an electrode mixture material layer coated on the surface of the collector foil. Then, at one side edge part of each electrode sheet, an uncoated part in which the electrode mixture material layer is not coated and the collector foil is exposed is formed. Then, a plurality of layers of electrode sheets of the positive electrode and the negative electrode are stacked so that the uncoated part of the electrode sheet on the positive electrode side protrudes from one side edge part, and so that the uncoated part of the electrode sheet on the negative electrode side protrudes from the other side edge part, thereby forming the electrode body 10. At the central part in the width direction X of the electrode body 10, a core part 12 at which the electrode mixture material layers of the positive electrode and the negative electrode are stacked one on another is formed. Then, at each opposite side edge part in the width direction X, a region in which a plurality of layers of uncoated parts (collector foils) are stacked one on another is formed. With the end of the region of a stack of the collector foils interposed, the collector foils are joined to one another, thereby forming a terminal connecting part 14. Incidentally, as shown in FIG. 2, between the core part 12 and the terminal connecting part 14, a converging part 13 in which the collector foils not being joined to one another converge toward the terminal connecting part 14 is formed.

Incidentally, the particular structure of the electrode body has no particular restriction so long as the terminal connecting part is formed. For example, the electrode body may be a wound electrode body obtained by winding and stacking long electrode sheets. Alternatively, the electrode body may be a lamination type electrode body obtained by stacking a plurality of rectangular electrode sheets. Further, as materials for members constituting the electrode body (e.g., the collector foil and the electrode mixture material layer), those usable for this kind of secondary battery can be used without particular restriction. The present disclosure is not restricted with respect to these materials, and hence detailed description will not be provided.

(2) Exterior Body

The exterior body 20 includes a pair of laminate films 22 and 24 facing each other across the electrode body 10. As shown in FIG. 1, at the outer circumferential edge of the exterior body 20, a welded part 26 where the pair of laminate films are welded together is formed. As a result, the electrode body 10 is accommodated in the inside of the exterior body 20 in a closed state.

(3) Electrode Terminal

The electrode terminal 30 is a plate-shaped conductive member extending along the width direction X. One end (first end) 32 of the electrode terminal 30 is connected with a lower surface 14a of the terminal connecting part 14 of the electrode body 10. Whereas, the other end (second end) 34 of the electrode terminal 30 is exposed to the outside of the exterior body 20. At the portion at which the electrode terminal 30 penetrates through the exterior body 20, the electrode terminal 30 is interposed between a pair of laminate films 22 and 24. Then, the laminate films 22 and 24 are welded to the surface of the electrode terminal 30. Specifically, as shown in FIG. 3, in the vicinity of the center of electrode terminal 30 in the width direction X, a welded film 36 extending along the depth direction Y is provided. Such a welded film 36 includes a thermally weldable resin material such as polypropylene. Respective members are placed so that the welded film 36 and the outer circumferential edges of the laminate films 22 and 24 overlap one another, thereby performing a welding treatment. As a result, the laminate films 22 and 24 can be preferably welded on the surface of the electrode terminal 30.

(4) Protective Member

As shown in FIG. 2, in the secondary battery 1 in accordance with the present embodiment, the protective member 40 is accommodated in the inside of the exterior body 20. In such a protective member 40, a terminal insertion hole 46 is formed, and the electrode terminal 30 inserted through the terminal insertion hole 46 is exposed to the outside of the exterior body 20. Further, the protective member 40 is placed between the side edge part 20a of the exterior body 20 in the width direction X and the electrode body 10. The protective member 40 can regulate the shrinkage deformation of the exterior body 20 toward the center in the width direction X. For this reason, the welded part 26 of the exterior body 20 can be prevented from being cleaved by the stress upon shrinkage. Incidentally, the protective member 40 preferably includes a resin material having a prescribed strength. For the resin materials forming such a protective member 40, thermoplastic resins such as polypropylene, polyethylene, and polyphenylene sulfide, and thermosetting resins such as phenol resin and epoxy resin can be used.

Figure 5A:
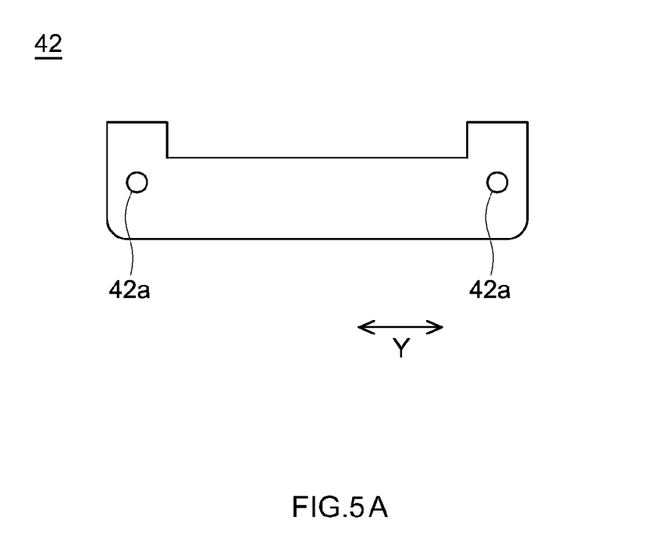
FIG. 5A is a bottom view showing the upper part of a protective member in the first embodiment of the present invention.
Figure 5B:
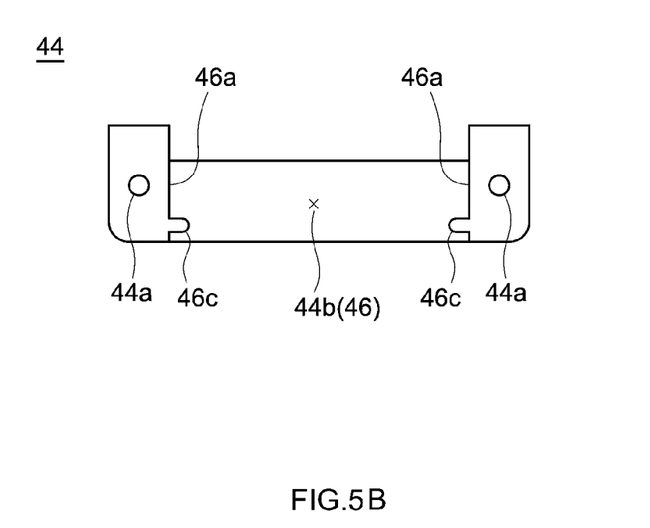
FIG. 5B is a plan view showing the lower part of the protective member in the first embodiment of the present invention.

Further, the protective member 40 in the present embodiment is divided into two members of the upper-side member 42 and the lower-side member 44, and is constructed by combining these. FIG. 5A shows a bottom view of the upper-side member 42 of the protective member 40, and FIG. 5B shows a plan view of the lower-side member 44. As shown in FIGS. 5A and 5B, each shape in a plan view (bottom view) of the upper-side member 42 and the lower-side member 44 is a substantially U shape. Further, a circular dent 42a is formed at each opposite end of the bottom surface of the upper-side member 42. On the other hand, a circular protrusion 44a is formed at each opposite end of the upper surface of the lower-side member 44. Then, the upper surface of the lower-side member 44 and the bottom surface of the upper-side member 42 are brought into surface contact with each other so that the protrusion 44a of the lower-side member 44 is inserted into the dent 42a of the upper-side member 42, thereby constructing the protective member 40. At this step, a step part 44b smaller in thickness than at the opposite ends is provided at the central part of the lower-side member 44 in the depth direction Y. For this reason, when the lower-side member 44 and the upper-side member 42 are combined to construct the protective member 40, a terminal insertion hole 46 is formed at the position corresponding to the step part 44b. With the protective member 40 of such a configuration, only by placing the electrode terminal 30 on the step part 44b of the lower-side member 44, and then combining the upper-side member 42, it is possible to construct a structure in which the electrode terminal 30 is inserted into the terminal insertion hole 46 with ease.

(5) Movement Regulating Means

As described above, the secondary battery disclosed herein has a movement regulating means for regulating the movement toward the center in the width direction of the protective member. As shown in FIG. 4, with the secondary battery 1 in accordance with the present embodiment, as the movement regulating means, an engaging part E for engaging the protective member 40 and the electrode terminal 30 is formed. Specifically, a recessed part 38 recessed inward in the depth direction Y is formed at each opposite end of the electrode terminal 30 in the present embodiment. On the other hand, at an inner wall 46a of the terminal insertion hole 46 of the protective member 40, a projected part 46c projecting inward in the depth direction Y is formed. Then, in the present embodiment, the recessed part 38 of the electrode terminal 30 and the projected part 46c of the protective member 40 are fitted with each other, thereby forming the engaging part E. As described above, the electrode terminal 30 is connected (fixed) to the terminal connecting part 14, and hence is not moved with respect to the electrode body 10. The protective member 40 is engaged with the electrode terminal 30 which is a member thus fixed. This can preferably regulate the movement of the protective member 40 toward the center side (electrode body 10 side) in the width direction X. For this reason, in accordance with the present embodiment, even when the exterior body 20 is largely shrunk in the decompression treatment, or the like, the breakage of the electrode body 10 due to the contact with the protective member 40 can be prevented. This can prevent the reduction of the battery performances during manufacturing steps.

Further, with the secondary battery 1 in accordance with the present embodiment, the two members of the upper-side member 42 and the lower-side member 44 are combined with each other, thereby forming the protective member 40. For this reason, the projected part 46c formed at the inner wall 46a of the terminal insertion hole 46 can be fitted into the recessed part 38 of the electrode terminal 30. Accordingly, the present embodiment can also contribute to the facilitation of the assembly between the terminal insertion hole 46 and the electrode terminal 30, and the improvement of the manufacturing efficiency.

Incidentally, the dimensions of the recessed part 38 and the projected part 46c have no particular restriction so long as the protective member 40 and the electrode terminal 30 can be engaged with each other, and can be appropriately changed, if required. At this step, respective dimensions are preferably adjusted so that the gap (clearance) between the recessed part 38 of the electrode terminal 30 and the projected part 46c of the protective member 40 is 1 mm or more. This allows the recessed part 38 of the electrode terminal 30 and the projected part 46c of the protective member 40 to be fitted with each other with ease. Further, from the viewpoint of preventing the breakage of the electrode body 10 (terminal connecting part 14) due to the contact with the inner wall 46a of the terminal insertion hole 46 of the protective member 40, the upper limit of the clearance is preferably set at 2 mm or less. For example, when the depth of the recessed part 38 of the electrode terminal 30 is 3 mm, the projection dimension of the projected part 46c of the protective member 40 may be set at 1 mm to 2 mm.

Further, for a conventional secondary battery 100 as shown in FIG. 9, in order to prevent the breakage of an electrode body 110, the following configuration is required: the end face 140a on the electrode body side of the protective member 140 is configured in such a shape as to follow the electrode body 110, so that the end face 140a and the electrode body 110 are brought into contact with each other. In contrast, as shown in FIG. 2, for the secondary battery 1 in accordance with the present embodiment, the movement of the protective member 40 in the width direction X can be regulated. For this reason, a clearance S can be formed between the end face 40a on the electrode body side of the protective member 40 and the converging part 13 of the electrode body 10. This resultantly increases the volume of the inside of the exterior body 20. Accordingly, it is possible to suppress the cleavage of the welded part 26 due to the expansion of the exterior body 20.

2. Second Embodiment

Figure 6:
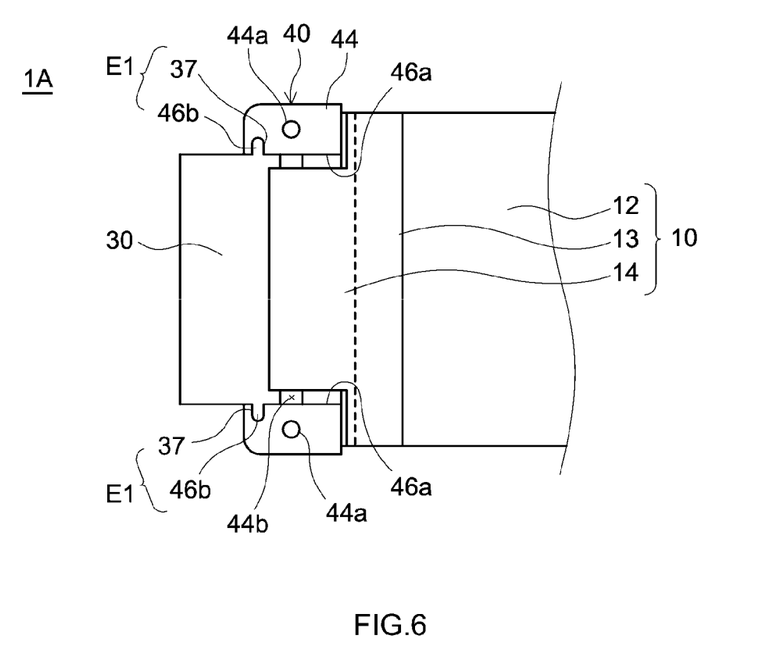
FIG. 6 is a plan view for illustrating a movement regulating means of a secondary battery in accordance with a second embodiment of the present invention.

With the secondary battery 1 in accordance with the first embodiment, the recessed part 38 of the electrode terminal 30 and the projected part 46c of the protective member 40 are fitted with each other, thereby forming the engaging part E. However, the structure of "the engaging part" is not limited to the embodiment. FIG. 6 is a plan view for illustrating a movement regulating means of a secondary battery in accordance with a second embodiment.

As shown in FIG. 6, with a secondary battery 1A in accordance with a second embodiment, a projected part 37 formed at each opposite side edge part of the electrode terminal 30 and a recessed part 46b formed at an inner wall 46a of a terminal insertion hole 46 of the protective member 40 are fitted with each other, thereby forming an engaging part E1. That is, in the second embodiment, the members respectively including the recessed part and the projected part formed therein are reversed from the first embodiment. Even with such a structure, the electrode terminal 30 and the protective member 40 can be engaged with each other. This can regulate the movement of the protective member 40 toward the center in the width direction X. For this reason, it is possible to prevent the reduction of the battery performances due to the breakage of the electrode body 10.

Incidentally, in the first and second embodiments, one engaging part achieves engagement between the electrode terminal and the protective member. However, the number of the engaging parts has no particular restriction, and may be at least one. With an increase in number of the engaging parts, the electrode terminal and the protective member are engaged with each other more firmly, so that the movement of the protective member tends to become more likely to be regulated. On the other hand, with a decrease in number of the engaging parts, the electrode terminal and the protective member become more likely to be assembled with each other, so that the production efficiency tends to be improved. From the viewpoints, the number of the engaging parts to be formed between the electrode terminal and the protective member may be set about one to three (e.g., two).

3. Third Embodiment

Figure 7:
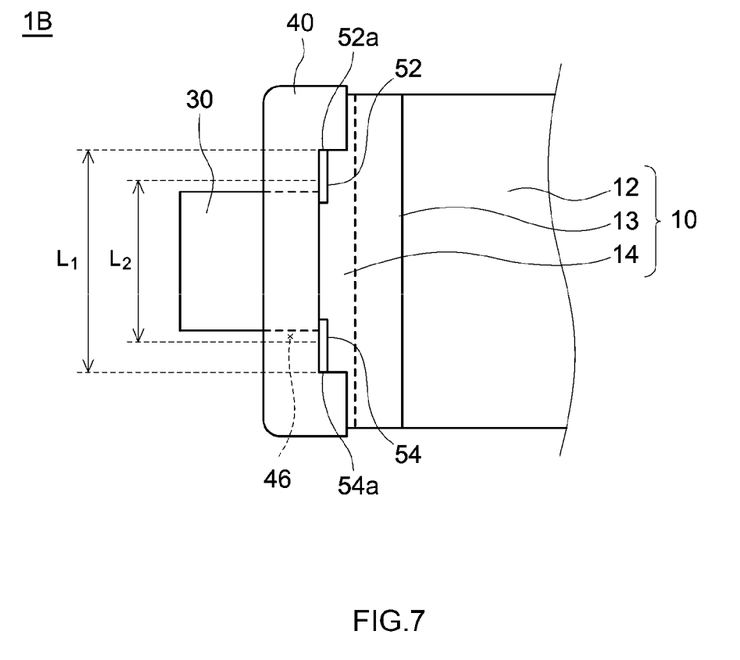
FIG. 7 is a plan view for illustrating a movement regulating means of a secondary battery in accordance with a third embodiment of the present invention.

In the first and second embodiments, as the movement regulating means, the engaging part obtained by engaging the electrode terminal and the protective member is formed. However, the specific structure of the movement regulating means is not limited to such an engaging part, and various structures can be adopted. As one example of the secondary battery having other movement regulating means than the engaging part, a secondary battery in accordance with a third embodiment will be described. FIG. 7 is a plan view for illustrating the movement regulating means of the secondary battery in accordance with the third embodiment.

As shown in FIG. 7, with a secondary battery 1B in accordance with the third embodiment, holding members 52 and 54 for holding the protective member 40 to the terminal connecting part 14 are provided. In the third embodiment, the holding members 52 and 54 function as movement regulating means, and regulate the movement of the protective member 40 inward in the width direction X. Specifically, a pair of the holding members 52 and 54 are mounted at the outer ends in the width direction X of the terminal connecting part 14 so as to interpose the electrode terminal 30 therebetween. Then, the holding members 52 and 54 extend outward in the depth direction Y. In the present embodiment, the dimensions of respective members are adjusted so that the dimension $L_1$ from the end 52a of a first holding member 52 to the end 54a of a second holding member 54 is longer than the dimension $L_2$ of the terminal insertion hole 46 in the depth direction Y (i.e., $L_1 > L_2$ holds). This stops and holds the protective member 40 at the terminal connecting part 14, and regulates the movement of the protective member 40 toward the center in the width direction X. As a result, even when the exterior body is largely shrunk by the decompression treatment, or the like, it is possible to prevent the breakage of the electrode body 10 (the core part 12 and the converging part 13) due to the contact with the protective member 40.

Note that it is essential only that the holding member can hold the protective member at the terminal connecting part, and the foregoing structure is not exclusive. Another example of such a holding member may include a holding member having a larger thickness than the height dimension of the terminal insertion hole of the protective member. Namely, by mounting a holding member with such a dimension as not to be inserted into the terminal insertion hole to the terminal connecting part, it is possible to regulate the free movement of the protective member with respect to the terminal connecting part. This can prevent the breakage of the electrode body due to the contact with the protective member.

4. Fourth Embodiment

Figure 8:
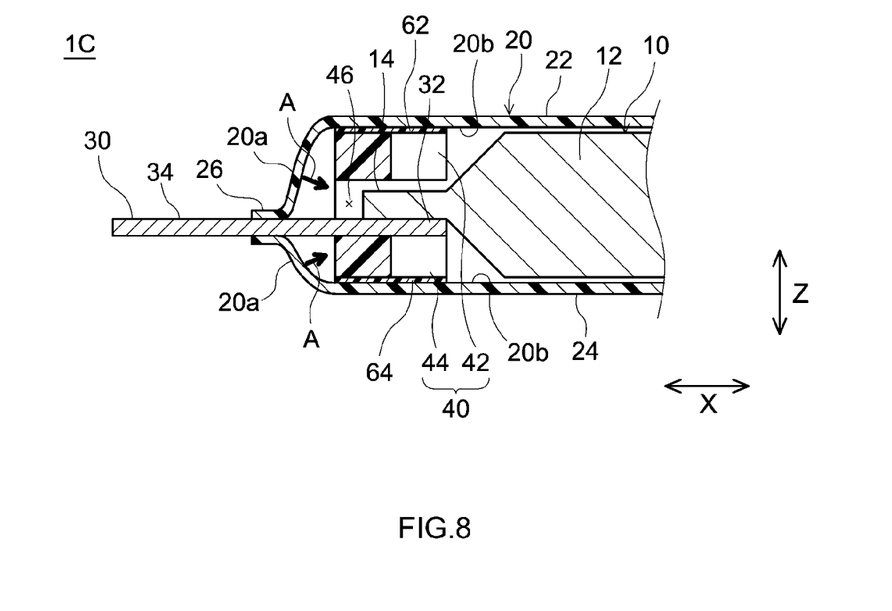
FIG. 8 is a cross sectional view for illustrating a movement regulating means of a secondary battery in accordance with a fourth embodiment of the present invention.

Then, as one example of a secondary battery having other movement regulating means than the engaging part and the holding member, a secondary battery in accordance with a fourth embodiment will be described. FIG. 8 is a cross sectional view for illustrating the movement regulating means of the secondary battery in accordance with the fourth embodiment. In a secondary battery 1C in accordance with the fourth embodiment, adhesion layers 62 and 64 for bonding the protective member 40 to the inner wall surface 20b of the exterior body 20 are provided. Then, the adhesion layers 62 and 64 function as the movement regulating means. In the present embodiment, the protective member 40 is bonded to the inner wall surface 20b of the exterior body 20 via the adhesion layers 62 and 64. Accordingly, the movement of the protective member 40 toward the center in the width direction X is regulated. For this reason, also in the present embodiment, it is possible to prevent the reduction of the battery performances due to the breakage of the electrode body 10. Incidentally, for the adhesion layers 62 and 64, the same kinds of resin materials as those of the welded film 36 of the electrode terminal 30 (see FIG. 3) can be used.

5. Fifth Embodiment

Figure 10:
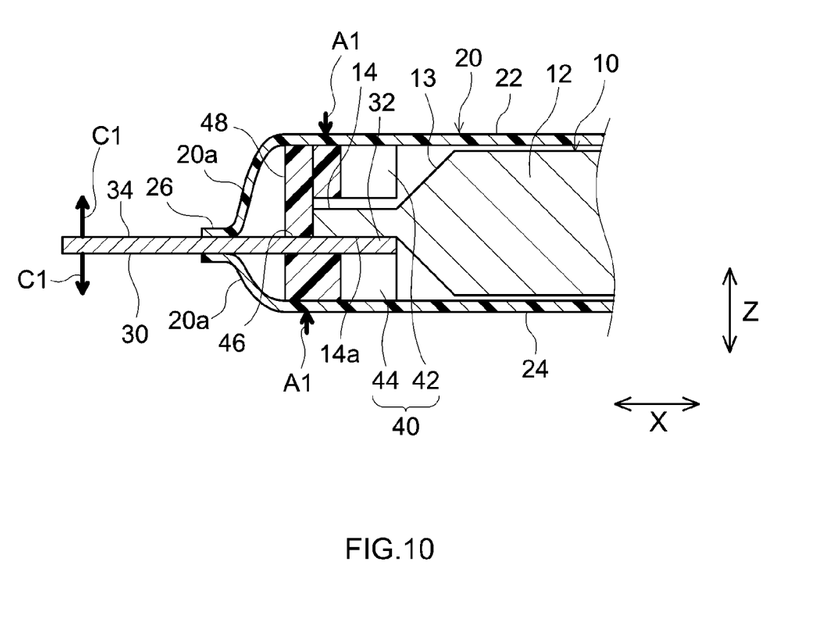
FIG. 10 is a cross sectional view schematically showing an internal structure in the vicinity of the electrode terminal of a secondary battery in accordance with a fifth embodiment of the present invention.
Figure 11:
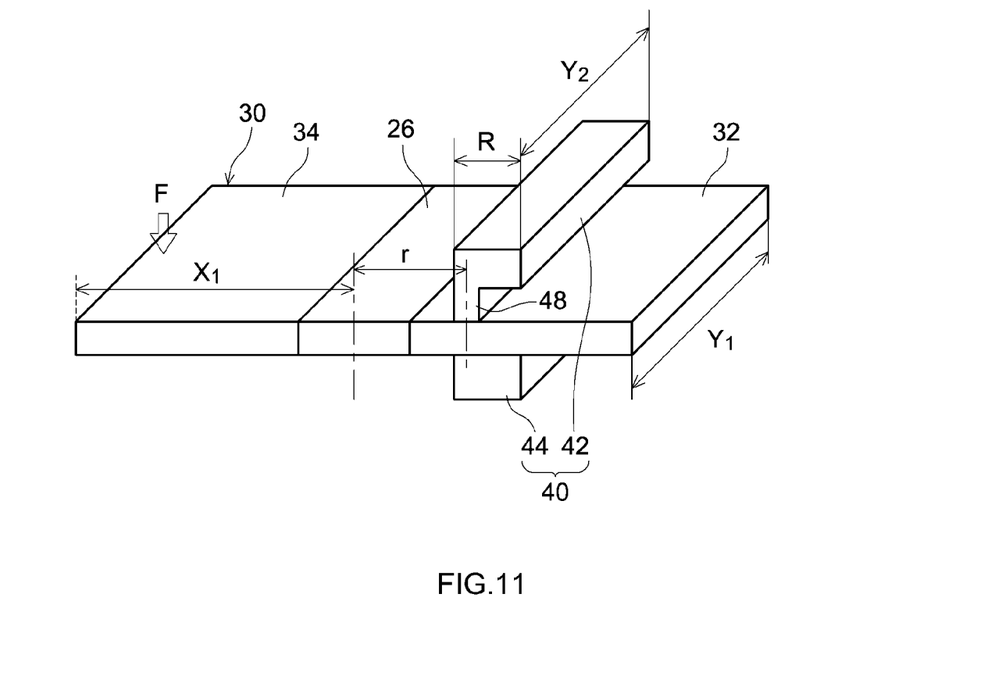
FIG. 11 is a perspective view for illustrating the dimensional relationship between the electrode terminal and the holding member in the secondary battery in accordance with the fifth embodiment of the present invention.

As described above, the movement regulating means in each of the embodiments regulates the movement of the protective member 40 in the width direction X. The secondary battery disclosed herein may have a structure of regulating the reciprocation of the electrode terminal 30 in the height direction Z in addition to these movement regulating means. FIG. 10 is a cross sectional view schematically showing the internal structure in the vicinity of the electrode terminal of a secondary battery in accordance with a fifth embodiment. FIG. 11 is a perspective view for illustrating the dimensional relationship between the electrode terminal and the holding member in the secondary battery in accordance with the fifth embodiment. Further, FIG. 13 is a cross sectional view schematically showing the internal structure in the vicinity of the electrode terminal of a conventional secondary battery.

Figure 13:
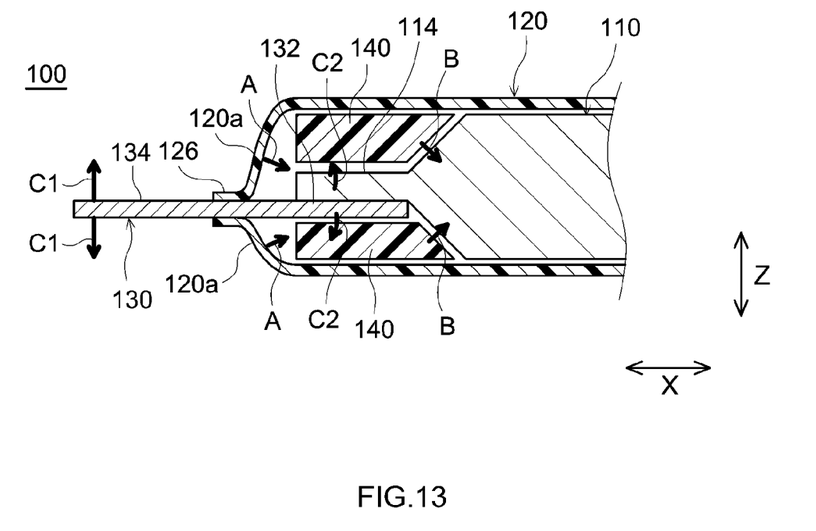
FIG. 13 is a cross sectional view schematically showing the internal structure in the vicinity of the electrode terminal of a conventional secondary battery.

Specifically, as shown in FIG. 13, for a conventional secondary battery 100, an external force C1 along the height direction Z may be applied to the other end 134 of an electrode terminal 130 exposed to the outside of an exterior body 120 due to the connection with an external device, an oscillation during use, or the like. In this case, one end 132 of the electrode terminal 130 connected with a terminal connecting part 114 of the electrode body 110 reciprocates along the height direction Z (see an arrow C2 in FIG. 13). When the reciprocation C2 along the height direction Z is repeated, the connection part between the one end 132 of the electrode terminal 130 and the terminal connecting part 114 may be broken.

In contrast, as shown in FIGS. 10 and 11, a protective member 40 of a secondary battery 1D in accordance with the fifth embodiment has a rib part 48 interposing the electrode terminal 30 in the height direction Z. Specifically, the rib part 48 in accordance with the present embodiment is a protrusion protruding from an upper-side member 42 toward a lower-side member 44 of the protective member 40. The electrode terminal 30 inserted through the terminal insertion hole 46 is interposed between the rib part 48 and the lower-side member 44. For this reason, the reciprocation along the height direction Z is regulated. As a result, even when an external force C1 along the height direction Z is applied to the other end 34 of the electrode terminal 30 repeatedly, it is possible to preferably prevent the breakage of the connection part between the electrode terminal 30 and the electrode body 10.

Further, in the present embodiment, respective dimensions shown in FIG. 11 may be set according to the following formula (1). As a result, it is possible to surely regulate the reciprocation of the electrode terminal 30 along the height direction Z, and to prevent the breakage of the connection part between the electrode terminal 30 and the electrode body 10.

$$F \times X_1/Y_1 < P \times R \times r/Y_2 \qquad (1)$$

F: Assumed load (N) of external force C1 in height direction Z $X_1$: Distance (mm) from end of electrode terminal 30 to center of welded part 26

$Y_1$: Width (mm) of electrode terminal 30

P: Differential pressure (MPa) between inside and outside of exterior body 20

R: Width (mm) of holding member 40 in contact with exterior body 20 r: Distance (mm) from center of welded part 26 to center of rib part 48

$Y_2$: Width (mm) of protective member 40

Further, the thickness t1 of the electrode terminal 30 in the present embodiment may be set from the viewpoint of preventing a load from being applied to the welded part 26 between the electrode terminal 30 and the exterior body 20 due to curvature deformation of the electrode terminal 30 with the portion interposed between the rib part 48 and the lower-side member 44 as the fulcrum. As one example, when aluminum (Young's modulus: 70 GPa) is used for the electrode terminal 30, the thickness t1 of the electrode terminal 30 may be set to 0.2 mm or more, 0.3 mm or more, and 0.4 mm or more. Alternatively, when a metallic material other than aluminum (such as copper or nickel) is used, the ratio of the Young's modulus (X GPa) of the used metal and the Young's modulus of aluminum may be determined. Thus, the thickness t1 of the electrode terminal 30 may be adjusted based on the Young's modulus ratio (see the following formula (2)).

$$t1=0.2 \text{ mm} \times (X/70) \tag{2}$$

Further, the rib part 48 may be formed so as to interpose the entire region in the depth direction (the direction perpendicular to the paper plane of FIG. 10) of the electrode terminal 30 situated in the inside of the terminal insertion hole 46. As a result, it is possible to more firmly interpose the electrode terminal 30, and to surely regulate the reciprocation of the electrode terminal 30 in the inside of the exterior body 20. Further, when such a rib part 48 as to interpose the electrode terminal 30 is formed in the entire region in the depth direction, the terminal insertion hole 46 is blocked by the rib part 48. As a result, foreign matters (such as fine active material particles) can also be prevented from being released to the outside of the battery when the welded part 26 of the exterior body 20 is opened.

Further, when as in the present embodiment, the rib part 48 is formed at the protective member 40, and the electrode terminal 30 is interposed by the rib part 48, the pressure in the inside of the exterior body 20 may be reduced by 10 kPa or more as compared with the standard atmospheric pressure (101.325 kPa). For example, the pressure in the inside of the exterior body 20 may be set to 90 kPa or less. By thus reducing the pressure in the inside of the exterior body 20, it is possible to pressurize the protective member 40 from the outside toward the inside of the exterior body 20 (see an arrow A1 in FIG. 10). As a result, the rib part 48 more preferably holds the electrode terminal 30, which can preferably prevent the breakage of the connection part between the electrode terminal 30 and the electrode body 10. Incidentally, from the viewpoint of more improving the terminal holding power at the rib part 48, the pressure in the inside of the exterior body 20 may be reduced by 50 kPa or more from the standard atmospheric pressure, and may be reduced by 100 kPa or more.

Incidentally, it is essential only that the rib part can interpose the electrode terminal, and can regulate the reciprocation along the height direction, and the structure shown in FIG. 10 is not exclusive. For example, the rib part 48 shown in FIG. 10 directly holds the electrode terminal 30. However, the rib part may also be formed so as to interpose the electrode terminal via the electrode body (typically, the terminal connecting part). Further, with the structure shown in FIG. 10, the rib part 48 is formed at the upper-side member 42 of the protective member 40. However, the rib part may also be formed at the lower-side member.

6. Sixth Embodiment

Figure 12:
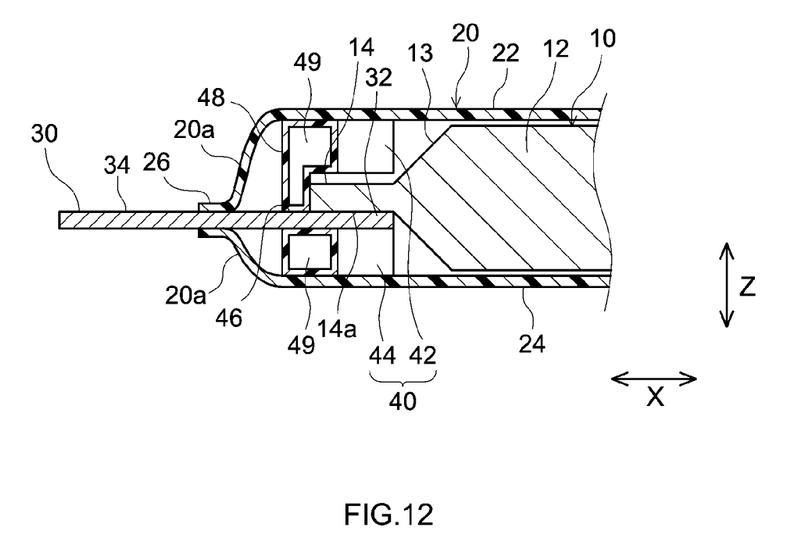
FIG. 12 is a cross sectional view schematically showing the internal structure in the vicinity of an electrode terminal of a secondary battery in accordance with a sixth embodiment of the present invention.

FIG. 12 is a cross sectional view schematically showing an internal structure in the vicinity of an electrode terminal of a secondary battery in accordance with a sixth embodiment. As shown in FIG. 12, in the protective member 40, an internal cavity 49 communicating with the internal space of the exterior body 20 may be formed. For a general secondary battery, the internal pressure of the exterior body tends to increase due to generation of a gas from the electrode body, or the like. For this reason, when a secondary battery whose warranty period has expired continues to be used for a long period, the exterior body expands by an increase in internal pressure, so that the welded part may be cleaved. In contrast, in the present embodiment, the internal cavity 49 communicating with the internal space of the exterior body 20 is formed in the protective member 40. For this reason, the volume of the inside of the exterior body 20 accommodating the gas increases. As a result, the period until the exterior body 20 expands and the welded part 26 is cleaved can be extended. This can contribute to the extension of the warranty period of the battery.

The volume of the internal cavity 49 of such a protective member 40 may be set to 1.5 mm$^3$ or more. The formation of the internal cavity 49 having such a volume can prevent the cleavage of the welded part due to an increase in pressure for a sufficiently long period. Incidentally, according to the prediction by the present inventors, by forming the internal cavity 49 of 3 mm$^3$ or more (more preferably, 4.5 mm$^3$ or more), it is possible to expect that the cleavage of the welded part due to the expansion of the exterior body can be prevented for a still longer period.

Further, when the internal cavity 49 is formed in the protective member 40 as in the present embodiment, as in the fifth embodiment, the rib part 48 may be formed in the protective member 40, and the inside of the exterior body is reduced in pressure. As described above, from the viewpoint of more preferably performing holding of the electrode terminal 30 by the rib part 48, the inside of the exterior body 20 may be reduced in pressure. At this step, the formation of the internal cavity 49 in the protective member 40 can keep the state in which the inside of the exterior body 20 is reduced in pressure for a long period. For this reason, it is possible to prevent the breakage of the connection part due to the reciprocation of the electrode terminal 30 along the height direction Z for a longer period.

7. Applicable Object

Up to this point, one example of the technology herein disclosed was described. Incidentally, the present disclosure is applicable to the secondary batteries of various structures without particular restriction. Namely, the present disclosure is applicable to any of an all-solid-state battery using a solid electrolyte as an electrolyte, a polymer battery using a polymer electrolyte, and a nonaqueous electrolyte secondary battery using a nonaqueous electrolyte. Incidentally, the present disclosure is particularly preferably applicable to an all-solid-state battery and a polymer battery of these secondary batteries. With a battery using a liquid electrolyte such as a nonaqueous electrolyte secondary battery, an excess electrolyte is present inside the battery. The excess electrolyte functions as a buffer material. For this reason, with a nonaqueous electrolyte secondary battery, large shrinkage of the exterior body in a decompression treatment, or the like tends to be suppressed. On the other hand, with an all-solid-state battery or a polymer battery, an excess electrolyte is not present inside the battery. Thus, the exterior body is largely shrunk in a decompression treatment, or the like. For this reason, with an all-solid-state battery or a polymer battery, the breakage of the electrode body due to the contact with the protective member tends to be caused. In accordance with the present disclosure, also with an all-solid-state battery or a polymer battery, it is possible to preferably prevent the breakage of the electrode body due to the contact with the protective member.

Further, also with a nonaqueous electrolyte secondary battery, a recent demand for cost reduction has resulted in a decrease in amount of electrolyte injected, and the breakage of the electrode body due to the contact with the protective member tends to increase. In accordance with the present disclosure, also with such a nonaqueous electrolyte secondary battery having a small amount of electrolyte injected, it is possible to preferably prevent the breakage of the electrode body due to the contact with the protective member. Specifically, when the ratio of the volume of the excess electrolyte to the total volume of the space region inside the exterior body is 20% or less, the breakage of the electrode body in a decompression treatment particularly becomes more likely to be caused. With the present disclosure, also for such a nonaqueous electrolyte secondary battery having a volume ratio of an excess electrolyte of 20% or less, it is possible to preferably prevent the breakage of the electrode body due to the contact with the protective member.

Up to this point, the specific examples of the present invention were described in details. However, these are merely illustrative, and do not restrict the scope of the appended claims. The technology described in the appended claims includes various modifications and changes of the specific examples exemplified up to this point.

What is claimed is:

1. A secondary battery, comprising:
    an electrode body including a terminal connecting part constituted of a plurality of layers of collector foils bonded to one another;
    an exterior body constituted of a pair of laminate films facing each other across the electrode body, and including a welded part where the pair of laminate films is welded together, which is formed at an outer circumferential edge part of the exterior body; and
    an electrode terminal being a plate-shaped conductive member extending along a width direction, wherein a first end of the electrode terminal is connected to the terminal connecting part and a second end of the electrode terminal is exposed to an outside of the exterior body,
    the secondary battery further comprising:
    a protective member that has a terminal insertion hole through which the electrode terminal is inserted, is placed between a side edge part of the exterior body in the width direction and the electrode body, and regulates shrinkage deformation of the exterior body toward a center in the width direction; and
    a movement regulating means for regulating movement of the protective member toward the center in the width direction, wherein
    as the movement regulating means, at least one engaging part for engaging the protective member and the electrode terminal with each other is formed, wherein the at least one engaging part is formed
    by fitting a projected part projecting inward in a depth direction from an inner wall of the terminal insertion hole of the protective member, and a recessed part being recessed inward in the depth direction from opposite side edge parts of the electrode terminal with each other, or
    by fitting a projected part projecting outward in the depth direction from the opposite side edge parts of the electrode terminal, and a recessed part being recessed outward in the depth direction from the inner wall of the terminal insertion hole of the protective member with each other.

2. The secondary battery according to claim 1,
    wherein the protective member includes a lower-side member including a step part that is formed at a central part in the depth direction, and has a smaller thickness than at opposite ends, and an upper-side member having a flat lower surface for making surface contact with upper surfaces of the opposite ends of the lower-side member.

3. The secondary battery according to claim 1
    wherein as the movement regulating means, an adhesion layer for bonding the protective member to an inner wall surface of the exterior body is provided.

4. The secondary battery according to claim 1,
    wherein the protective member has a rib part that holds the electrode terminal in the height direction.

5. The secondary battery according to claim 4,
    wherein the rib part holds the entire region in the depth direction of the electrode terminal situated in the inside of the terminal insertion hole.

6. The secondary battery according to claim 4,
    wherein the pressure in the inside of the exterior body is reduced by 10 kPa or more as compared with the standard atmospheric pressure.

7. The secondary battery according to claim 1,
    wherein an internal cavity communicating with the internal space of the exterior body is formed in the protective member.

8. The secondary battery according to claim 1,
    wherein a clearance is formed between an end face on the electrode body side of the protective member and the electrode body.

9. A secondary battery comprising:
    an electrode body including a terminal connecting part constituted of a plurality of layers of collector foils bonded to one another;
    an exterior body constituted of a pair of laminate films facing each other across the electrode body, and including a welded part where the pair of laminate films is welded together, which is formed at an outer circumferential edge part of the exterior body; and
    an electrode terminal being a plate-shaped conductive member extending along a width direction, wherein a first end of the electrode terminal is connected to the terminal connecting part and a second end of the electrode terminal is exposed to an outside of the exterior body,
    the secondary battery further comprising:
    a protective member that has a terminal insertion hole through which the electrode terminal is inserted, is placed between a side edge part of the exterior body in the width direction and the electrode body, and regulates shrinkage deformation of the exterior body toward a center in the width direction; and
    a movement regulating means for regulating movement of the protective member toward the center in the width direction, characterized in that
    as the movement regulating means, a holding member for holding the protective member at the terminal connecting part is formed.

10. The secondary battery according to claim 9,
    wherein a pair of the holding members are mounted at outer ends in the width direction of the terminal connecting part so as to extend in the depth direction interposing the electrode terminal therebetween.

11. The secondary battery according to claim 10
    wherein a dimension L1 of from an end of a first holding member to an end of a second holding member is longer than a dimension L2 of the terminal insertion hole in the depth direction (L1>L2).

12. The secondary battery according to claim 9 wherein as the movement regulating means, an adhesion layer for bonding the protective member to an inner wall surface of the exterior body is provided.

13. The secondary battery according to claim 9, wherein the protective member has a rib part that holds the electrode terminal in the height direction.

14. The secondary battery according to claim 13, wherein the rib part holds the entire region in the depth direction of the electrode terminal situated in the inside of the terminal insertion hole.

15. The secondary battery according to claim 13, wherein the pressure in the inside of the exterior body is reduced by 10 kPa or more as compared with the standard atmospheric pressure.

16. The secondary battery according to claim 9, wherein an internal cavity communicating with the internal space of the exterior body is formed in the protective member.

17. The secondary battery according to claim 9, wherein a clearance is formed between an end face on the electrode body side of the protective member and the electrode body.

* * * * *